(12) United States Patent
Tomkins et al.

(10) Patent No.: US 7,246,217 B1
(45) Date of Patent: Jul. 17, 2007

(54) INTERCONNECTION ARRANGEMENT OF ROUTERS OF PROCESSOR BOARDS IN ARRAY OF CABINETS SUPPORTING SECURE PHYSICAL PARTITION

(75) Inventors: James L. Tomkins, Albuquerque, NM (US); William J. Camp, Albuquerque, NM (US)

(73) Assignee: Sandia Corporation, Albuquerque, NM (US)

( * ) Notice: Subject to any disclaimer, the term of this patent is extended or adjusted under 35 U.S.C. 154(b) by 212 days.

(21) Appl. No.: 11/110,344

(22) Filed: Apr. 19, 2005

Related U.S. Application Data

(60) Provisional application No. 60/563,333, filed on Apr. 19, 2004.

(51) Int. Cl.
*G06F 15/163* (2006.01)
(52) U.S. Cl. .......................... 712/28; 709/238
(58) Field of Classification Search ............... None
See application file for complete search history.

(56) References Cited

U.S. PATENT DOCUMENTS

| | | | | |
|---|---|---|---|---|
| 5,175,865 | A * | 12/1992 | Hillis | 712/13 |
| 5,546,596 | A * | 8/1996 | Geist | 709/243 |
| 5,841,775 | A * | 11/1998 | Huang | 370/422 |
| 6,680,915 | B1 * | 1/2004 | Park et al. | 370/254 |
| 2005/0018665 | A1 * | 1/2005 | Jordan et al. | 370/388 |
| 2005/0193357 | A1 * | 9/2005 | Honary et al. | 716/17 |

OTHER PUBLICATIONS

Ron Brightwell and Lee Ann Fisk, "Scalable Parallel Application Launch on Cplant,"8 pp., Nov. 2001, Sandia National Laboratories, Albuquerque, NM.
Ron Brightwell, Lee Ann FISK, David S. Greenberg, Tramm Hudson, Mike Levenhagen, Arthur B. MacCabe, and Rolf Riesen, "Massively parallel computing using components" 29 pp. Parallel Computing 25 (2000) 243-266, Elsevier Science B.V.
Kevin Pedretti, Ron Brightwell and Joshua Williams, "Cplant Runtime System Supoprt for Multi-Processor and Heterogeneous Compute Nodes", 8 pp., IEEE International Conference on Cluster Computer, Jun. 2002.
Timothy G. Mattson and Greg Henry, "An Overview of the Intel TFLOPS Supercomputer", 12 pp., Intel Technology Journal vol. 2, No. 1, 1st Q, 1998.

\* cited by examiner

*Primary Examiner*—Kenneth S. Kim
(74) *Attorney, Agent, or Firm*—Madelynne J. Farber

(57) ABSTRACT

A multiple processor computing apparatus includes a physical interconnect structure that is flexibly configurable to support selective segregation of classified and unclassified users. The physical interconnect structure includes routers in service or compute processor boards distributed in an array of cabinets connected in series on each board and to respective routers in neighboring row cabinet boards with the routers in series connection coupled to routers in series connection in respective neighboring column cabinet boards. The array can include disconnect cabinets or respective routers in all boards in each cabinet connected in a toroid. The computing apparatus can include an emulator which permits applications from the same job to be launched on processors that use different operating systems.

13 Claims, 5 Drawing Sheets

INTERCONNECTION ARRANGEMENT OF ROUTERS OF PROCESSOR BOARDS IN ARRAY OF CABINETS SUPPORTING SECURE PHYSICAL PARTITION

This application claims the priority under 35 U.S.C. §119(e)(1) of co-pending provisional application Ser. No. 60/563,333, filed Apr. 19, 2004 and incorporated herein by reference.

This application discloses subject matter that is related to subject matter disclosed in co-pending U.S. Ser. No. 11/110, 466 entitled "DISTRIBUTED COMPUTE PROCESSOR ALLOCATOR ARCHITECTURE FOR MULTIPLE PROCESSOR COMPUTING APPARATUS", and U.S. Ser. No. 11/110,206 entitled "FAULT TOLERANT, DEADLOCK-FREE ROUTING, AND ROUTING-BASED PROCESSOR ALLOCATION IN A MULTIPLE PROCESSOR COMPUTING APPARATUS", both filed concurrently herewith.

This invention was developed under Contract DE-AC04-94AL8500 between Sandia Corporation and the U.S. Department of Energy. The U.S. Government has certain rights in this invention.

FIELD OF THE INVENTION

The invention relates generally to multiple processor computing and, more particularly, to supercomputing.

BACKGROUND OF THE INVENTION

A multiple processor computer apparatus, such as a supercomputer, is typically used in a wide variety of applications that require massive amounts of computation. Examples of such applications include shock physics, radiation transport, materials aging and design, computational fluid dynamics, structural dynamics, etc.

Historically, the performance of supercomputers has been measured in a number of ways, including by peak floating-point operations per second, by simple benchmarks such as MPLINPACK, and by complex physical simulations. The best conventional supercomputers have achieved 70-75% of peak performance on the MPLINPACK benchmark. However, for many complex simulation codes, the performance is only 10-20% of peak for a single processor and can be as low as one or two percent when parallel efficiency is considered. The performance, as measured against peak, for complex simulation codes has been declining in recent supercomputing generations. This trend seems to be continuing in the newest supercomputers.

One area of computer hardware design that has contributed significantly to this trend is the machine interconnect structure. Interconnect hardware development has severely lagged behind the pace of increasing processor performance. The shift from tightly coupled Massively Parallel Processor (MPP) designs such as the Intel ASCI Red and Cray T3E designs, to clusters that use I/O buses for interconnect connections, has resulted in not only a relative reduction in interconnect performance, but also in an absolute reduction. At the same time, processor performance has been increasing rapidly. This combination has resulted in growing performance imbalance in large parallel computer systems. Also, the size of machines in terms of the number of processors has been increasing, putting even more stress on interconnect performance. The result has been poor scalability compared to that achieved on earlier generations of tightly coupled MPPs, and poor overall efficiency of computer systems.

Another factor that is having a negative impact on performance is the poor scalability of the operating system and operating system services such as job loading, internal communication, network communication, file management and file I/O.

Many users will typically utilize a supercomputer to perform a wide variety of applications, including the examples given above. Some of these applications may include classified information that can only be made available to a limited number of users, and must not be made available to all users of the supercomputer. Accordingly, some type of partitioning mechanism is necessary to separate classified applications from unclassified users. Although it is necessary to partition unclassified users from classified applications, it is nevertheless desirable to effectuate this partitioning with a minimum amount of inconvenience to the unclassified users. This challenge of providing classified/unclassified partitioning, while also minimizing the inconvenience to unclassified users has been a problem in conventional systems.

It is desirable in view of the foregoing to provide for a multiple processor computing apparatus which can avoid the various difficulties described above.

Exemplary embodiments of the invention provide a physical interconnect structure that permits a multiple processor computing apparatus to be flexibly configurable for selective segregation of classified and unclassified users. The physical interconnect structure also provides for easy physical scalability of the computing apparatus. Some embodiments provide an emulator that permits launching applications from the same job on processors that use different operating systems.

DETAILED DESCRIPTION

The following definitions and acronyms are used herein:

Application In the context of this document, an application runs on one or more compute processors (and also service processors in some cases) and is managed by Launcher. Users create applications and run them on a computing system. The user's purpose for using the computing system is to run applications.

Batch Job A type of job that runs unattended. Users submit batch jobs to a batch system in the form of a job script. The batch system determines when and where (i.e., on which service processor) the job script should be run.

Compute Processor The computing system is typically made up of many thousand compute processors. Applications run on a partition of compute processors that was allocated by the CPA.

Interactive Job A type of job that requires user interaction. Interactive jobs are submitted to the batch system in a similar way to batch jobs, but without a job script. When the batch system launches an interactive job, it opens up a shell on a login processor for the user to interact with. Interactive jobs are useful for tasks such as debugging.

Job A job is a task or set of tasks being performed by or on behalf of a user (e.g. invoke Launcher to launch an application). Jobs are submitted by users to the batch system in the form of a job script. The batch system determines when a job should run based on a scheduling policy and the available resources. The batch system terminates a job when it exceeds its time limit. A job is considered finished when its job script exits.

Job Script A UNIX shell script defining the commands to run for a batch job. Typically, a job script will contain one or more Launcher invocations.

Login Processor The computing system is typically made up of many login processors. Users are placed onto login processors by a load balancing mechanism. Launcher can only be run from login processors.

Partition A partition defines a physical set of compute processors. The batch system allocates a partition for each job it launches. A job can only access the compute processors in its partition. Purely inactive launchers (those not part of a batch job) also run inside of a partition. When an interactive launcher wishes to run its application, it must first create a partition.

PCT One process control thread (PCT) daemon runs on each compute processor. Launcher communicates with PCTs in order to launch and manage its application. The CPA communicates with PCTs in certain error cases.

Showmesh The Showmesh program used by users to display the state of all compute processors in the system.

Launcher Launcher is the program that launches and manages an application running on compute processors. Launcher must request and be granted a set of compute processors from a compute processor allocator before it can run its application.

Figure 1:
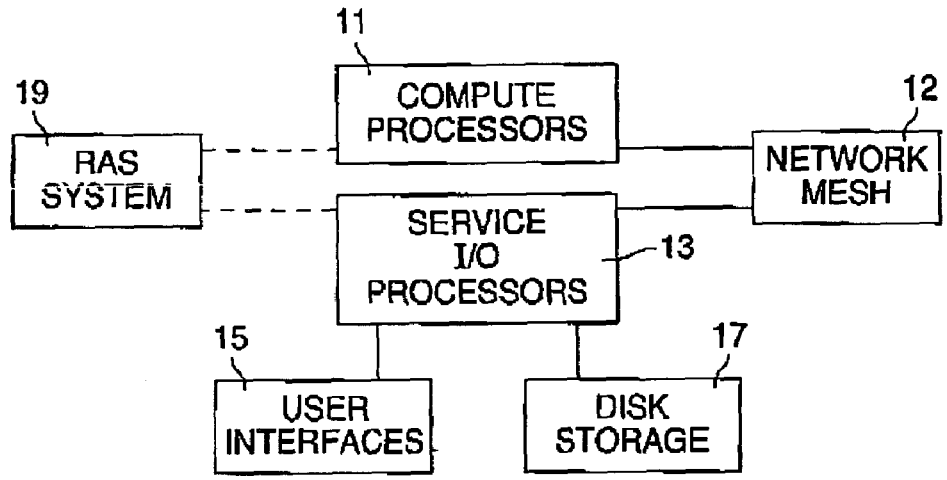
FIG. 1 diagrammatically illustrates a computing apparatus according to exemplary embodiments of the invention.

FIG. 1 diagrammatically illustrates a multiple processor computing apparatus according to exemplary embodiments of the invention. The computing apparatus includes a plurality of compute processors designated generally at 11, and a plurality of service I/O processors designated generally at 13. The processors at 13 are also referred to herein simply as service processors. The service processors at 13 provide for interfacing to users and disk data storage, as indicated generally at 15 and 17, and can also support other services and external interfaces. A network mesh 12 interconnects the compute processors 11 among one another, interconnects the service processors 13 among one another, and interconnects the compute processors 11 with the service processors 13. The compute processors 11 primarily run computationally intensive applications. Also illustrated in FIG. 1 is a reliability, availability and serviceability (RAS) system 19 as shown by broken line. The RAS system 19 is cooperable with the compute processors 11 and the service processors 13 to support reliability, accessibility and serviceability of the computing apparatus.

Figure 2:
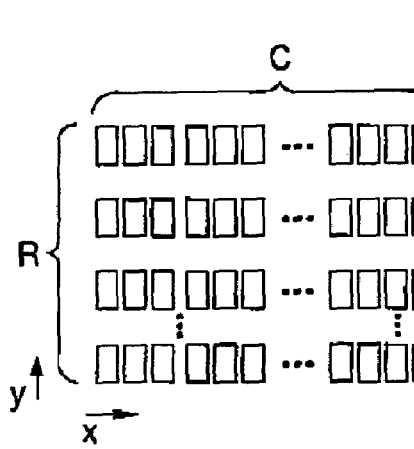
FIG. 2 illustrates a cabinet arrangement for a computing apparatus according to exemplary embodiments of the invention.

FIG. 2 illustrates an arrangement of cabinets for housing the compute processors 11 and service processors 13 of FIG. 1 according to exemplary embodiments of the invention. As shown in FIG. 2, the cabinets are arranged in a generally rectangular array having R rows and C columns for a total of RC cabinets. Each of the cabinets houses a plurality of the processors illustrated generally at 11 and 13 in FIG. 1. This is illustrated in more detail in FIG. 3.

Figure 3:
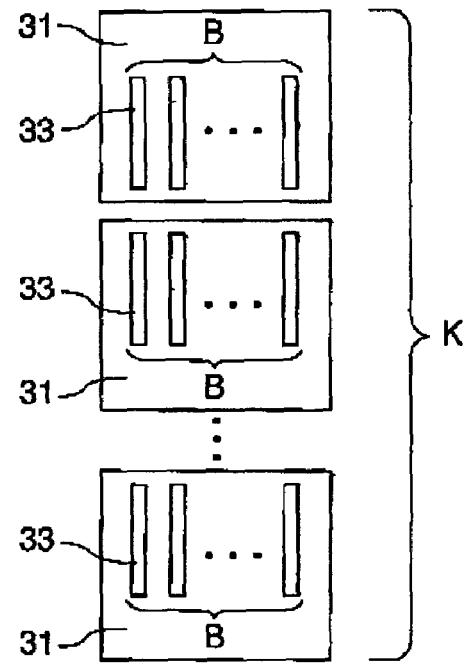
FIG. 3 diagrammatically illustrates a circuit board and card cage arrangement within a cabinet of FIG. 2 according to exemplary embodiments of the invention.

FIG. 3 diagrammatically illustrates the interior layout of each of the cabinets of FIG. 2 according to exemplary embodiments of the invention. As shown in FIG. 3, each of the cabinets of FIG. 2 has mounted therein K card cages 31, each of which in turn houses B printed circuit cards or boards 33. The compute processors 11 and service processors 13 are mounted on the circuit boards 33. In some embodiments, each cabinet is either a compute processor cabinet or a service processor cabinet, wherein compute processor cabinets include only compute processors 11 and service processor cabinets include only service processors 13.

Figure 4:
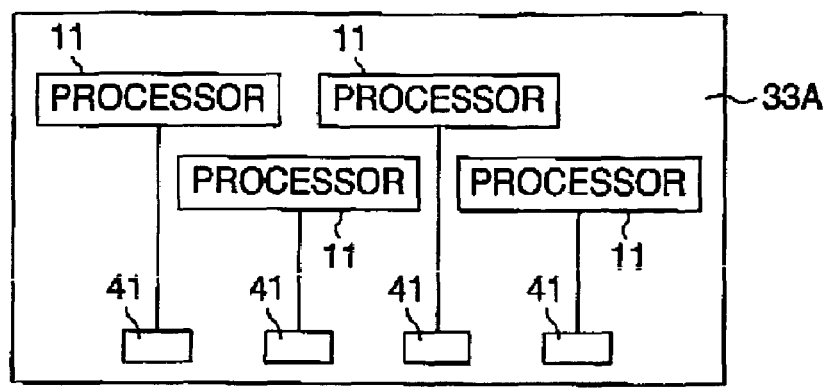
FIG. 4 diagrammatically illustrates a compute processor board according to exemplary embodiments of the invention.

FIG. 4 diagrammatically illustrates a compute processor board according to exemplary embodiments of the invention. The compute processor board 33A of FIG. 4 represents an example of a circuit board 33 of FIG. 3 having only compute processors 11 mounted thereon. Each of the four compute processors 11 is connected to a respectively corresponding router integrated circuit chip 41. In some embodiments, the compute processors 11 are commercially available AMD Opteron (Sledgehammer) data processing integrated circuits. In various embodiments, the routers 41 are implemented by commercially available network interface chips or custom ASIC chips. The routers 41 form part of the network mesh 12 of FIG. 1 as will be described hereinbelow in further detail.

Figure 5:
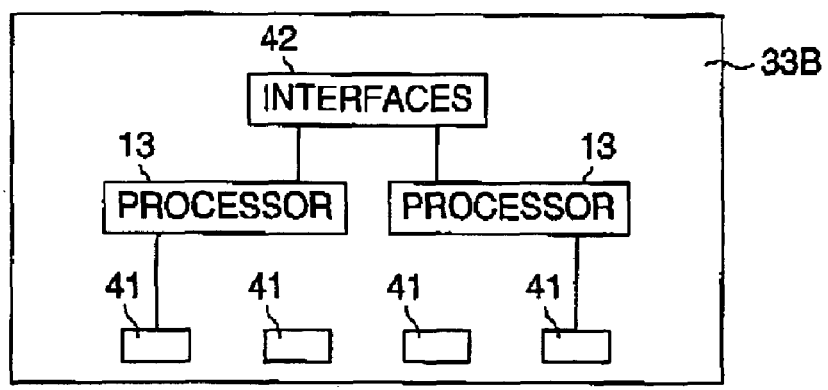
FIG. 5 diagrammatically illustrates a service processor board according to exemplary embodiments of the invention.

FIG. 5 diagrammatically illustrates a service processor board according to exemplary embodiments of the invention. The service processor board 33B of FIG. 5 includes four routers 41 as described above with respect to FIG. 4, two of which are connected to respectively corresponding service processors 13. The service processor board 33B also includes interfaces connected to the two service processors 13. These interfaces are designated generally at 42. In some embodiments, the interfaces at 42 can include Ethernet interfaces, Fiber Channel (FC) interfaces, graphics cards, etc. All of the routers 41 in FIG. 5, including those not connected to the service processors 13, form part of the network mesh 12 of FIG. 1. In some embodiments, the service processors 13 are AMD Opteron (Sledgehammer) data processing integrated circuits.

For clarity of exposition, some components (such as local memory devices) not necessary for understanding the present invention have been omitted in FIGS. 4 and 5.

Referring to FIGS. 2-5, some exemplary embodiments include R=4 rows of cabinets, C=31 columns of cabinets, K=3 card cages per cabinet, and B=8 circuit boards per card cage. In such embodiments, a compute processor cabinet which houses only compute processors would house 4×24=96 compute processors, and a service processor cabinet which houses only service processors would house 2×24=48 service processors. In some embodiments, 27 of the 31 columns are populated with compute processor cabinets, and the remaining 4 columns (2 columns on each end of the array) include only service processor cabinets. Such embodiments thus include 4×27×96=10,368 compute processors and 4×4×48=768 service processors. The network mesh 12 of FIG. 1, in conjunction with the generally rectangular cabinet array of FIG. 2, permits the computing apparatus to be physically scaled upwardly to include more processors as desired.

Figure 6:
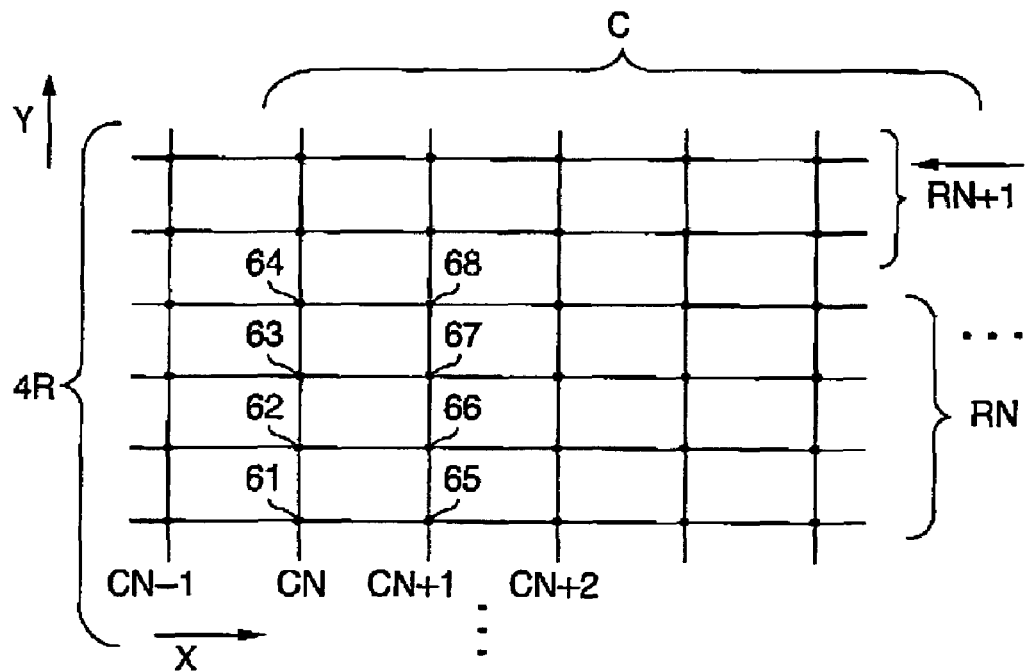
FIG. 6 is a two-dimensional logical view of the network mesh of FIG. 1.

FIG. 6 diagrammatically illustrates a portion of the network mesh 12 of FIG. 1 according to exemplary embodiments of the invention. As will become apparent hereinbelow, the network mesh 12 is logically conceptualized as a three-dimensional network which interconnects the routers 41 of the compute processor boards and service processor boards of FIGS. 4 and 5. FIG. 6 illustrates a portion of a single xy plane in the logical three-dimensional network mesh. Each two-dimensional xy plane of the network mesh represents the interconnections of respective circuit boards located at one of the KB locations in the cabinet arrangement of FIG. 3. Any given board mounted at any given board position in any one of the cabinets in the rectangular array is interconnected to the correspondingly positioned board in each adjacent processor cabinet of the array. The routers 41 of the first board at the left in the upper card cage 31 of FIG. 3 are interconnected with the respectively corresponding routers of the corresponding boards at that same board position in each adjacent processor cabinet of the array. Moreover, for any given board, all four routers thereof are connected in series with one another. Accordingly, the network nodes at 61, 62, 63 and 64 of FIG. 6 correspond to routers of a single circuit board, either a service board or a compute board. Note that these four routers are connected in series with one another, and are also connected to the respectively corresponding four routers of the positionally corresponding board in the next adjacent cabinets in the row (in the +x and −x directions). So, for example, routers 61-64 are respectively connected in the +x direction to routers 65-68. Also, each set of series connected routers 61,62,63,64 and 65,66,67,68 of a given board is connected in series with a set of series connected routers of the positionally corresponding board in the next adjacent cabinets in the column (in the +y and −y directions).

For the cabinet array of FIG. 2, with R rows and C columns, each xy plane (or planar grid) of the logical network mesh corresponds to the interconnections of the routers of all boards in the same corresponding board positions in the cabinets. So the xy plane will include 4RC of the routers 41 of FIGS. 4 and 5. The routers on each board are connected in series with one another, each router is connected to its corresponding router on the correspondingly positioned board in the next row-adjacent cabinet, and each set of series connected routers of a given board is connected in series with the set of series connected routers of the correspondingly positioned board of each column-adjacent cabinet. This results in 4R series connected routers per column of FIG. 2 (y direction of FIG. 6), and 4 sets of C interconnected routers per row of FIG. 2 (x direction of FIG. 6). Adjacent columns in FIG. 6 are indicated at CN−1, CN, CN+1, and CN+2, and adjacent rows in FIG. 6 are indicated at RN and RN+1.

Figure 7:
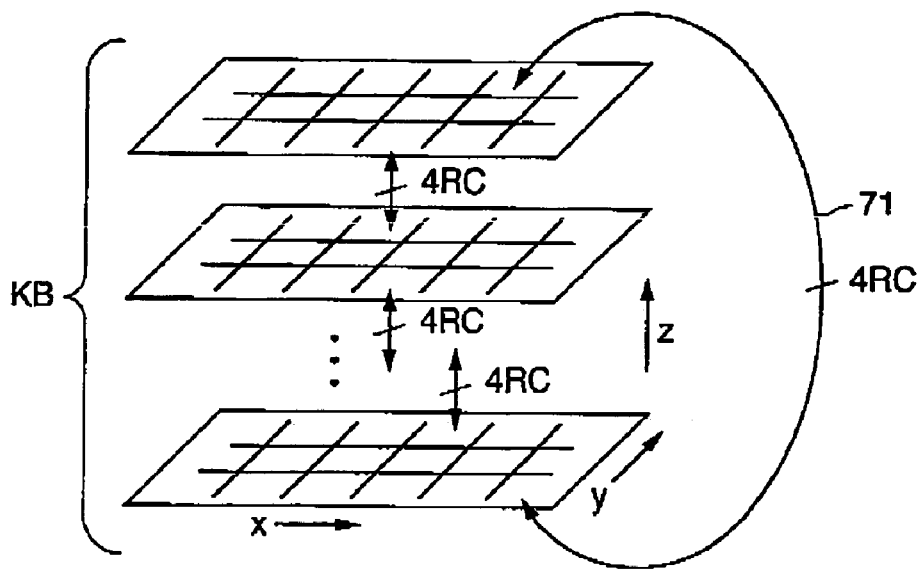
FIG. 7 is a three-dimensional logical view of the network mesh of FIG. 1.

FIG. 7 illustrates the third logical dimension of the network mesh 12. There are KB logical network grid planes (xy planes), one for each of the KB circuit board positions illustrated in FIG. 3. Each of the KB planar grids is constructed identically to the exemplary planar grid described above with respect to FIG. 6. The KB planar grids are interconnected with one another to form the third dimension of the three-dimensional logical network mesh. This interconnection in the third logical dimension (z dimension) represents the interconnection within each cabinet (see also FIG. 2) of each router to its corresponding router on each of the other KB−1 boards in that cabinet. In the z direction, the corresponding routers are interconnected to form a torus, as illustrated by the wrap-around connection at 71 in FIG. 7.

More particularly, and referring to FIG. 4 as an example, the left-most router 41 of FIG. 4 would be connected in a torus with each of the other KB−1 left-most routers on the other KB−1 circuit boards within its cabinet. So each router of each board is interconnected with every other positionally corresponding router of every other board in the cabinet to form a torus. As mentioned above with respect to FIG. 6, each planar grid of the mesh includes 4RC routers, so there are 4RC interconnections in the z direction between each plane of the three-dimensional network mesh, as illustrated in FIG. 7.

Figure 8:
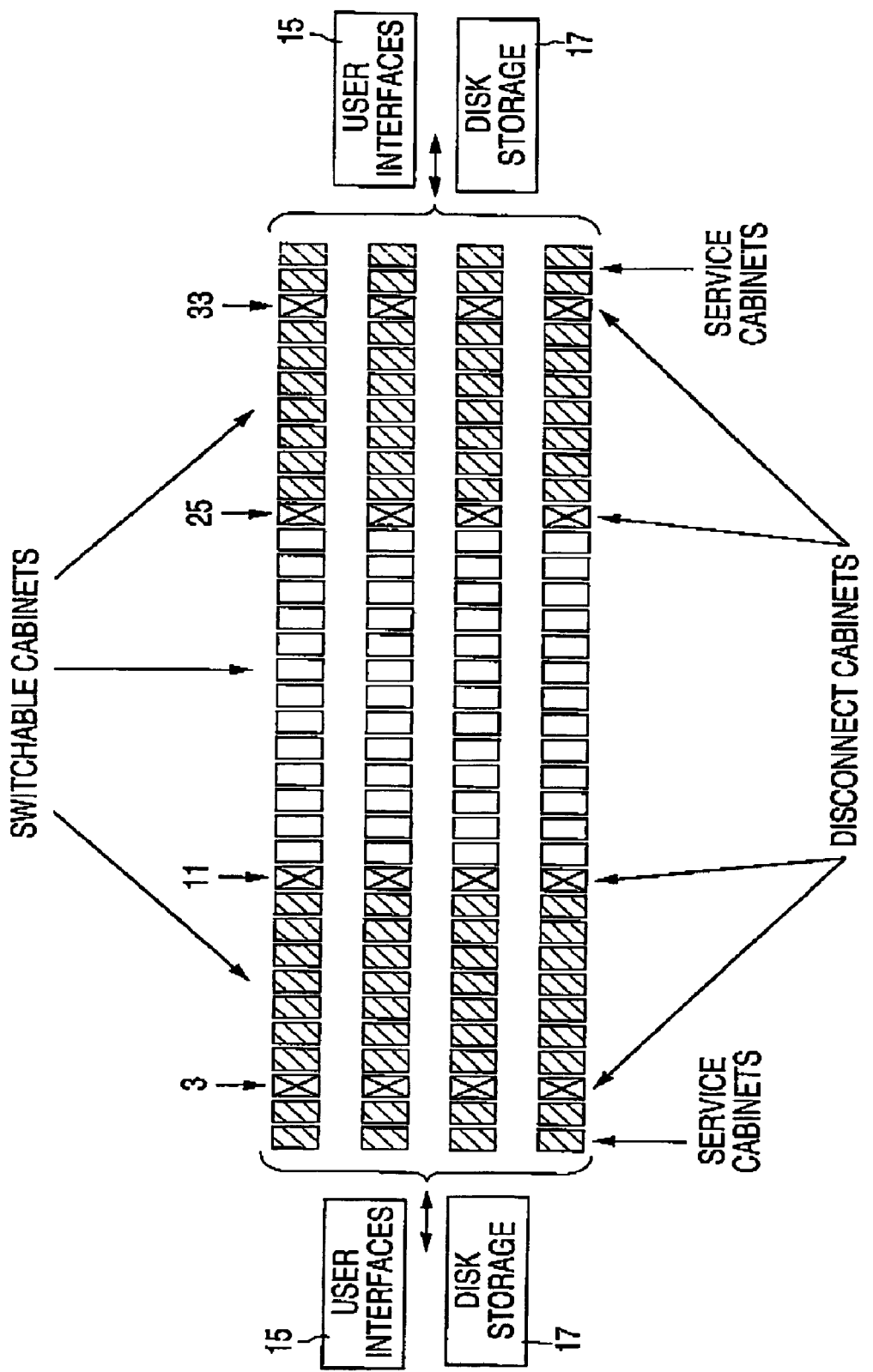
FIG. 8 illustrates a cabinet arrangement similar to that of FIG. 2, including classified/unclassified partitioning according to exemplary embodiments of the invention.

FIG. 8 is similar to FIG. 2, and illustrates an exemplary classified/unclassified partitioning arrangement which permits secure access to classified applications, while still permitting unclassified users to access the computing apparatus. The rectangular cabinet array of FIG. 8 includes 4 rows and 35 columns. Two pairs of columns at each end are service processor cabinets (service cabinets) which house only service boards, 4 columns of disconnect cabinets are distributed between the outer columns of service cabinets, and the remaining cabinets between the outer two pairs of service cabinet columns are compute processor cabinets (compute cabinets) which house only compute boards. Each row thus includes 27 compute cabinets, 4 service cabinets and 4 disconnect cabinets. The FIG. 8 arrangement is distinguished from the prior art, wherein service processors are dispersed among compute processors in cabinets at both ends of the cabinet array Each of the disconnect cabinets includes a switching structure which is designated generally by an X in the cabinet. These switching structures permit the x direction connections in the three-dimensional network grid to be selectively closed and opened in order to provide flexibility for classified/unclassified partitioning. In the example of FIG. 8, all compute cabinets between the end pairs of service cabinet columns are selectively switchable into communication with one another and with either of the end pairs of service cabinet columns. The service cabinets provide access to the user interfaces and disk storage 15 and 17 (see also FIG. 1).

When all of the switch structures are closed to make all x-direction connections between all cabinets, then all compute cabinets and all service cabinets are available to all users. When the switch structures in the cabinets of Column 33 are opened and all other switches are closed, users at 15 on the right-hand side of FIG. 8 can still utilize the right-hand pair of service cabinet columns to access disk storage 17 at the right-hand side. In this configuration, all of the compute cabinets and the left-hand pair of service cabinet columns are available for classified operations for users at the left-hand side, and are also isolated from unclassified users at the right-hand side. If this configuration is modified by closing the switches at Column 33 and opening those at Column 25, then users at the right-hand side would have access to the compute cabinets between Columns 25 and 33, but still would not have access to the remainder of the compute cabinets, and vice versa for the users on left-hand side of the arrangement. Thus, various combinations of opening and closing the switches in Columns 3, 11, 25 and 33 can provide various numbers of compute cabinets for either classified or unclassified operations, but in any event unclassified users can still access service cabinets and disk storage. In other switch configurations, the unclassified users can access some, or even most of the compute cabinets, depending on the amount of compute cabinets needed for the desired classified operations.

Referring again to FIGS. 3-6 and the corresponding description, there are 4 KB connections between row-adjacent processor cabinets, so the switching structures must each be capable of switching 4 KB communication paths. In the aforementioned example where K=3 and B=8, each of the 16 switch structures illustrated in FIG. 8 must be capable of switchably making and breaking 4×3×8=96 x-direction connections between cabinets.

Figure 9:
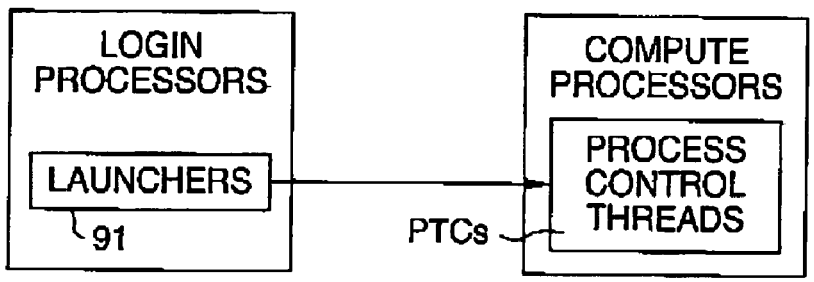
FIG. 9 diagrammatically illustrates the launching of applications on compute processors according to exemplary embodiments of the invention.

FIG. 9 diagrammatically illustrates an example of how applications can be launched on compute processors in the computing apparatus of FIGS. 1-8. In the example of FIG. 9, a subset of the service processors known as login processors support launching programs, designated generally as launchers 91 in FIG. 9. The launching programs communicate with process control threads (PCTs) in the various compute processors in order to effectuate launching of the desired applications. In some embodiments, the launchers 91 can utilize conventional techniques to launch applications on the compute processors. For example, a launcher 91 can read the binary image of the executable into memory, and then, via the network mesh, fan that binary image out logarithmically across the compute processors which have been allocated to run the application. In general, such cooperation between launching programs and process control threads in compute processors is conventional.

Figure 10:
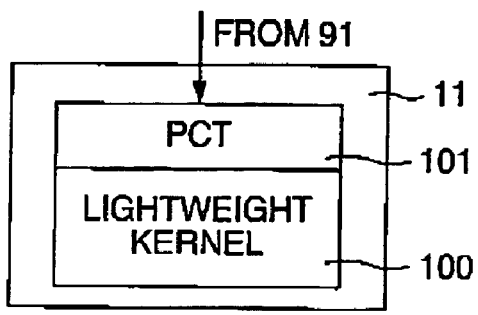
FIG. 10 diagrammatically illustrates an operating system of compute processors according to exemplary embodiments of the invention.

FIG. 10 diagrammatically illustrates an operating system of the compute processors 11 according to exemplary embodiments of the invention. In the example of FIG. 10, the compute processor operating system includes a lightweight kernel which is custom tailored to support the types of application codes that the compute processors are intended to execute. In general, the use of a lightweight kernel operating system on a processor that executes computationally intensive applications is conventional. FIG. 10 also illustrates a PCT (process control thread) layer on top of the lightweight kernel. This is the layer that the launchers 91 of FIG. 9 communicate with to effectuate launching and management of applications. The PCT layer in turn interfaces with the lightweight kernel to support launching and managing the application.

Figure 11:
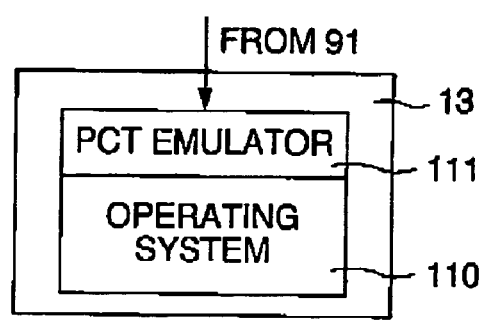
FIG. 11 diagrammatically illustrates an operating system of service processors according to exemplary embodiments of the invention.

FIG. 11 diagrammatically illustrates an operating system used by at least some of the service processors 13 according to exemplary embodiments of the invention. The service processors 13 include a generally full-featured operating system 110, for example UNIX, a UNIX derivative, or Linux. Such a full-featured operating system is provided in order to permit the service processors 13 to provide the various service and I/O functions described above. A PCT emulator layer 111 is provided on top of the full-featured operating system 110. This PCT emulator 111 interfaces between the launchers 91 of FIG. 9 and the operating system 110. In this regard, the PCT emulator 111 presents to the launchers the same interface presented by the PCT layer 101 of FIG. 10. This permits the launchers 91 to launch and manage applications within a single batch job on both service processors 13 and compute processors 11. The PCT emulator 111 looks like the PCT layer 101 to the launchers 91, and the PCT emulator translates between the communication format of the launchers 91 and the communication format expected by the operating system 110. From the perspective of the launchers 91, communication with the service processors 13 appears identical to communication with the compute processors 11.

The aforementioned capability of launching and managing applications from a single job on both compute processors 11 and service processors 13 permits the service processors 13 to render support processing (e.g., graphics processing) relative to the computational information produced by the compute processors 11 involved in the job. Without the PCT emulator layer 111, the launchers within a single job can launch and manage applications on either the compute processors 11 or the service processors 13, but not on both compute and service processors during the same job. Therefore, without the PCT emulator 111, any computations produced by the compute processors 11 would need to be stored on disk storage 17 (see also FIGS. 1 and 8), and the aforementioned support processing performed by the service processors 13 would have to be performed on the stored computations during another job.

Figure 12:
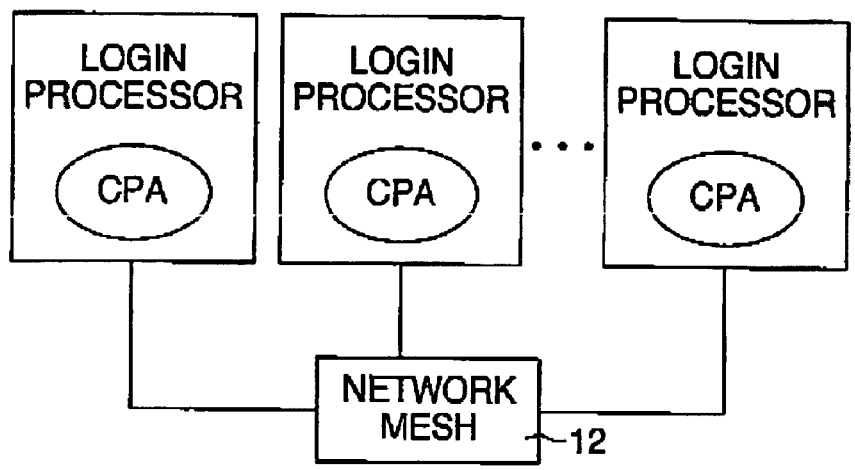
FIG. 12 diagrammatically illustrates a compute processor allocator architecture according to exemplary embodiments of the invention.

FIG. 12 diagrammatically illustrates a compute processor allocator architecture according to exemplary embodiments of the invention. As shown in FIG. 12, each of the aforementioned login processors (see also FIG. 9) includes a compute processor allocator (CPA) whose purpose is to allocate compute processors 11 to users of the computing apparatus. Typically, the computing apparatus will have many simultaneous users (for example 60) and will contain thousands of compute processors (for example over 10,000).

Figure 13:
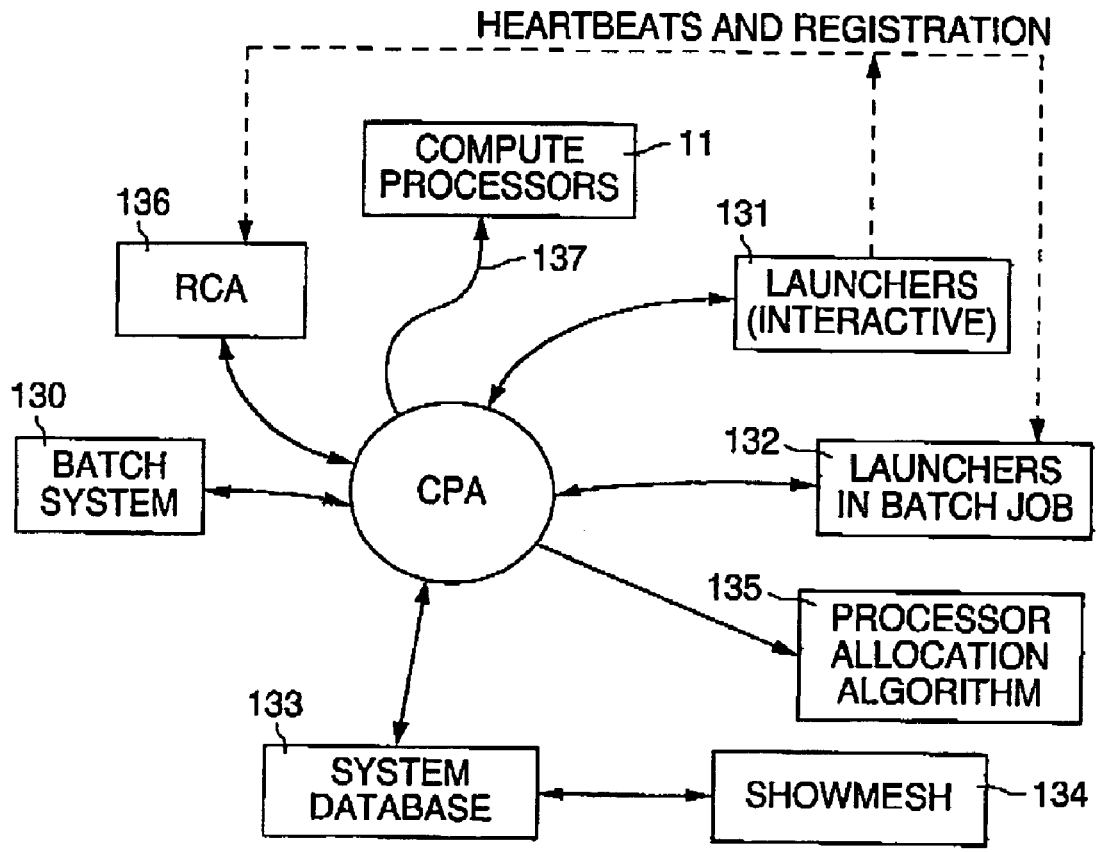
FIG. 13 diagrammatically illustrates operations and interactions of a compute processor allocator according to exemplary embodiments of the invention.

The CPAs can be implemented as daemons (e.g. UNIX programs written in C) running on the respective login processors. FIG. 13 diagrammatically illustrates various entities which interface with any given CPA daemon. The CPA daemon can communicate with each of the illustrated entities via suitable application programming interfaces and associated library functions. The use of application programming interfaces for communication among software models is well known in the art. In some embodiments, the batch system 130 (running on a service processor 13) and the launchers are the only clients of the CPA. The launcher clients are illustrated generally at 131 and 132 in FIG. 13. As illustrated, some launchers are part of jobs that have been dispatched by the batch system 130, and other launchers are interactive launchers which launch applications for activities such as interactive development and debugging operations.

In some embodiments, the CPA daemons run continuously on the respective login processors. The CPA daemon accepts requests from its clients, launchers and the batch system. The CPA daemon waits for client requests in its main dispatch loop. Upon receiving a client request, the CPA processes the request and returns the result to the client. It then returns to waiting. Client requests are processed in FIFO order. The CPA daemon can also respond to event indicators received from the RCA (Resiliency Communication Agent) 136. As described in more detail below, upon receiving an RCA event, the CPA determines if it must take action, and if so, performs the required action. It can then return to waiting in its main dispatch loop. RCA events are processed in FIFO order.

The batch system 130 can cooperate with a CPA to create and assign a compute processor partition for each job before it is started. In this sense, a compute processor partition is simply a number of processors required by the batch job (or interactive application). Each launcher that is part of a batch job must allocate compute processors from the partition in which the job is running. An interactive launcher can cooperate with a CPA to create and assign to itself its own compute processor partition, and can then allocate processors from the partition for the application to be launched by the interactive launcher.

In some embodiments, the compute processors are divided into a batch pool and an interactive pool, the batch pool available for batch jobs, and the interactive pool available for the applications launched by interactive launchers. Only the batch system 130 may create a partition in the batch pool. When the batch system 130, or an interactive launcher at 131, requests the CPA to create a partition, the CPA retrieves from the system database 133 a list of available compute processors. This aspect of the invention is useful because state information for the entire computing apparatus can be stored in the system database 133. This means that all of the CPA daemons can be stateless. This decreases the processing burden placed on the login processors to run the CPA daemons, and also makes the CPA daemons more modular in nature and more easily selectable to replace one another in the even of CPA failures. The system database 133, in some embodiments, is implemented by one or more service processors 13 running the commercially available MySQL server, and accessing disk storage 17 (see also FIG. 1).

Once the CPA receives the list of available processors from the system database 133, the CPA calls a physical processor allocation algorithm 135 (which can be included as part of the CPA daemon in some embodiments) and provides that algorithm with the list of available processors, the partition size requested by the client, and a processor ID list to use when allocating the compute processors. The processor ID list is optionally provided by the batch system or interactive launcher program to specifically identify the compute processors desired for its applications.

In some embodiments, the physical processor allocation algorithm 135 can allocate compute processors according to any suitable conventionally available algorithm. Once the compute processor allocation has been completed at 135, the CPA communicates with the system database 133 to update the overall system state such that it reflects the new compute processor allocation, and provides the new compute processor allocation information to the requesting client.

When a batch job exits, the batch system 130 requests destruction of the partition that the job was running in. An interactive launcher requests destruction of its partition when it exits. Whenever the CPA destroys a partition, it updates the system database appropriately to reflect this destruction.

As indicated above, the system database 133 stores persistent state information such as what compute processors are available for allocation, how many compute processors are available for allocation, how many compute processors a job is allowed to use, and what launchers are running and which compute processors have been assigned to them. If any part of the CPA architecture crashes, the system database information is used to restore state when the CPA architecture is restarted. This use of database backend has several benefits. First, it provides robust mechanisms for storing state. When system state is to be changed, a conventional atomic database transaction can be used to insure that the state is either completely updated or not at all. This improves upon prior art systems that store persistent state information in a flat file. It is difficult to ensure that a flat file is written consistently when the CPA crashes.

Another advantage is that the database backend provides a straightforward mechanism for storing and efficiently querying structured information, for example using standard SQL statements. Designing database tables is less error prone and more flexible than designing custom data structures for the CPA. Finally, the use of a database enables the compute processor allocator architecture to be distributed. Conventional network databases are designed to multiplex many simultaneous clients (e.g., CPAs). Locking mechanisms and transaction semantics are provided to prevent clients from conflicting with one another and corrupting data.

Furthermore with respect to the system database 133, a program designated as Showmesh 134 in FIG. 13 provides users with the capability of accessing the state information stored in the system database 133. In some embodiments, the Showmesh program illustrated in FIG. 13 runs on a service processor 13, and uses the conventional SQL2C library to query the system database 133. By interacting directly with the system database on behalf of interested users, the Showmesh program provides a communication path to the system database that is independent of the CPA daemons. The design of the CPA daemons can thus be simpler than in prior art systems wherein the CPA daemons support user access to the database.

Some embodiments do not require that a CPA daemon run on each login processor. In such embodiments, the CPA daemon is designed such that it can process requests from launchers running on other login processors which do not have CPA daemons. However, by maximally distributing CPA daemons among the login processors, the burden of management duties on any single CPA daemon will be reduced. The distributed design of the CPA structure is more scalable than prior art single daemon approaches. At the same time, distributing the CPA daemons only among the login processors provides advantages in terms of processing power when compared to prior art systems that provide CPA daemons on every compute processor.

In some embodiments, the persistent state information maintained in the system database 133 of FIG. 13 includes some or all of the information described below.

| Processor ID | Alloc Mode | Partition ID | Launcher ID |
|---|---|---|---|
| Integer | batch/ interactive/ reserved | 64-bit/ NONE | 64-bit/ NONE |

The Compute Processor Allocation Table contains one row (example row shown above) for every compute processor in a compute system that is available for allocation. The 'Alloc Mode' field specifies how the processor can be allocated. If the 'Alloc Mode' is set to batch, the processor may be allocated to batch jobs. If 'Alloc Mode' is set to interactive, the processor may be allocated to batch jobs and interactive Launchers. If 'Alloc Mode' is set to reserved, the processor may not be assigned in the future. The 'Partition ID' field specifies the partition ID that a process is part of, or is NONE if the processor isn't part of a partition. The 'Launcher ID' field specifies the Launcher ID that the processor has been assigned to, or NONE if the processor isn't assigned to a Launcher.

| Partition ID | Administration Cookie | Allocation Cookie | User ID | Batch Job ID | Partition Creation Time | Max In Use | Batch Job Error |
|---|---|---|---|---|---|---|---|
| unsigned 64-bit | 64-bits | 64-bit | String | integer/NONE | Date and time | Integer | boolean |

The Partition Table contains one entry (example entry shown above) for each compute processor partition in the system. The compute processors making up a partition can be obtained by inspecting the Compute Processor Allocation Table. The 'Partition ID' filed stores the ID that the CPA assigned to the partition. This If) is guaranteed to be unique within a single boot-shutdown cycle of the computing apparatus. The 'Administration Cookie' field stores a pseudo-random number that a client must match in order to destroy the partition. The 'Allocation Cookie' field stores a pseudo-random number that a client must match in order to allocate processors from a partition. Both cookie fields can only be read and set by the CPA daemon. The 'User ID' specifies the UNIX user name of the partition's owner. The 'Batch Job ID' field specifies the batch job ID that the partition has been assigned to, or NONE if the partition is in use by an Interactive Launcher. The 'Partition Creation Time' field stores the date and time when the partition was created. The "Max In Use" field stores the maximum number of compute processors simultaneously in use by Launchers running inside of the partition. The 'Batch Job Error' flag is set when a batch job encounters an error with one or more compute processors in the partition. This flag is also set when a Launcher running inside of the partition that is part of a batch job exits abnormally.

| Launcher ID | Launcher Cookie | Partition ID | Login Processor | Process ID | Command | Creation Time |
|---|---|---|---|---|---|---|
| unsigned 64-bit | 64-bits | unsigned 64-bit | Integer | unsigned | String | date and time |

The Launcher Table contains one entry (example entry shown above) for each Launcher running in the system. The 'Launcher ID' field stores the ID that the CPA assigned to the Launcher. This ID is guaranteed to be unique within one single boot-shutdown cycle of a compute system. The 'Launcher Cookie' field stores a pseudorandom number that CPA clients must match in order to manipulate the Launcher entry. The 'Launcher Cookie' field is only accessible by the CPA daemon. The 'Partition ID' field stores the ID of the partition that the Launcher is running within. The 'Login Processor' field stores the ID of the login processor that the Launcher is executing on. The 'Process ID' field stores the UNIX process ID of the Launcher. The 'Command' field contains the Launcher command line string. The Launcher command line string is communicated by the Launcher to the CPA when it allocates processors from a partition. The 'Creation Time' field stores the date and time that the Launcher entry was created.

In some embodiments, each launcher registers with the RCA 136, then cooperates with a CPA to obtain a compute processor allocation, and then launches its application. The RCA, provided on every login processor in some embodiments, monitors a periodic heartbeat signal provided by the launcher. When the launcher's application has completed and the launcher exits, it unregisters with the RCA. If the launcher heartbeat signal ends before the launcher unregisters with the RCA, then the RCA reports this occurrence to the CPA. This indicates that the launcher has exited improperly in some manner. The CPA responds to this indication by invoking an executable on its login node, which executable "cleans up" the compute processors by interrupting and closing any still-running applications that had been launched by the launcher that exited improperly. The operation of the "clean up" executable is designated generally at 137 in FIG. 13.

Although exemplary embodiments of the invention have been described above in detail, this does not limit the scope of the invention, which can be practiced in a variety of embodiments.

What is claimed is:

1. A computing apparatus, comprising:
  a plurality of compute boards, each said compute board having mounted thereon a plurality of compute processors and a plurality of routers coupled to said plurality of compute processors;
  a plurality of service boards, each said service board having mounted thereon a plurality of service processors and a plurality of routers, some of said routers coupled to said plurality of service processors;
  said compute boards and said service boards each including a same number of said routers;
  a plurality of groups of said compute boards respectively provided in a plurality of compute cabinets, and a plurality of groups of said service boards respectively provided, without any of said compute processors, in a plurality of service cabinets;
  said compute cabinets and said service cabinets arranged in rows and columns of a generally rectangular array of cabinets;
  within each said row of cabinets, each said router of each of a group of said cabinets in said row connected to a respectively corresponding router on a respectively corresponding board in each of two nearest neighbor cabinets in said row;
  within each of said compute boards and each of said service boards, said routers thereof connected in a series configuration with one another;
  within each of said columns, each said series configuration of routers of each of a group of said cabinets in said column connected in series with a respectively corresponding series configuration of routers on a respectively corresponding board in each of two nearest neighbor cabinets in said column; and
  disconnect cabinets provided in said rectangular array of cabinets, each of said disconnect cabinets interposed between respective pairs of said nearest neighbor cabinets and including a switch structure for selectively making and breaking said connections between said routers of the associated nearest neighbor cabinets, said disconnect cabinets positioned relative to said compute cabinets and said service cabinets in said rectangular array such that, when said switch structures of a first group of said disconnect cabinets break the associated connections, some of said compute cabinets are disconnected from a first group of said service cabinets while remaining connected to a second group of said service cabinets, and said disconnect cabinets positioned such that when said switch structures of a second group of said disconnect cabinets break the associated connections, some of said compute cabinets are disconnected from said second group of service cabinets while remaining connected to said first group of service cabinets.

2. The apparatus of claim 1, wherein each of said compute processors includes a lightweight kernel operating system tailored to support types of application code that run on said compute processors, each said compute processor also including a first interface for interfacing between said lightweight kernel operating system and a launch program that launches applications on said compute processor, each of said service processors including a general purpose operating system and a second interface for interfacing between said general purpose operating system and a launch program that launches applications on said service processor, said second interface emulating said first interface.

3. The apparatus of claim 1, wherein, within each of said service cabinets and said compute cabinets, each said router of each said board is connected in a torus configuration with corresponding routers on the remaining boards.

4. The apparatus of claim 1, wherein all of said compute cabinets are disconnected from said first group of service cabinets and remain connected to said second group of service cabinets when said first group of disconnect cabinets break the associated connections, and all of said compute cabinets are disconnected from said second group of service cabinets and remain connected to said first group of service cabinets when said second group of disconnect cabinets break the associated connections.

5. The apparatus of claim 1, wherein a number of compute cabinets connected to said second group of service cabinets when said first group or disconnect cabinets break the associated connection is greater than a number of compute cabinets connected to said first group of service cabinets when said second group of disconnect cabinets break the associated connections.

6. The apparatus of claim 5, wherein said disconnect cabinets are positioned to define a plurality of said columns within said rectangular array of cabinets.

7. The apparatus of claim 1, wherein said disconnect cabinets are positioned to define a plurality of said columns within said rectangular array of cabinets.

8. The apparatus of claim 7, wherein one of said columns of said disconnect cabinets is interposed between at least one column of said rectangular array that consists only of service cabinets and the remainder of said cabinets, and wherein another of said columns of disconnect cabinets is interposed between at least one further column in said array of cabinets that consists only of service cabinets and the remainder of said cabinets.

9. The apparatus of claim 1, including user interfaces coupled to at least some of said service boards within said first and second groups of service cabinets.

10. The apparatus of claim 9, including disk storage facilities coupled to at least some of said service boards within said first and second groups of service cabinets.

11. The apparatus of claim 1, including disk storage facilities coupled to at least some of said service boards within said first and second groups of service cabinets.

12. A computing apparatus, comprising:
a plurality of compute boards, each said compute board having mounted thereon a plurality of compute processors and a plurality of routers coupled to said plurality of compute processors;
a plurality of service boards, each said service board having mounted thereon a plurality of service processors and a plurality of routers, some of said routers coupled to said plurality of service processors;
said compute boards and said service boards each including a same number of said routers;
a plurality of groups of said compute boards respectively provided in a plurality of compute cabinets, and a plurality of groups of said service boards respectively provided in a plurality of service cabinets;
said compute cabinets and said service cabinets arranged in rows and columns of a generally rectangular array of cabinets;
within each said row of cabinets, each said router of each of a group of said cabinets in said row connected to a respectively corresponding router on a respectively corresponding board in each of two nearest neighbor cabinets in said row;
within each of said compute boards and each of said service boards, said routers thereof connected in a series configuration with one another;
within each of said columns, each said series configuration of routers of each of a group of said cabinets in said column connected in series with a respectively corresponding series configuration of routers on a respectively corresponding board in each of two nearest neighbor cabinets in said column; and
within each of said service cabinets and said compute cabinets, each said router of each said board connected in a torus configuration with corresponding routers on the remaining boards.

13. The apparatus of claim 12, wherein each of said compute processors includes a lightweight kernel operating system tailored to support types of application code that run on said compute processors, each said compute processor also including a first interface for interfacing between said lightweight kernel operating system and a launch program that launches applications on said compute processor, each said service processor including a general purpose operating system and a second interface for interfacing between said general purpose operating system and a launch program that launches applications on said service processor, said second interface emulating said first interface.

* * * * *